United States Patent [19]

Kimura et al.

[11] Patent Number: 4,469,658

[45] Date of Patent: Sep. 4, 1984

[54] SINTERED SILICON CARBIDE MATERIALS HAVING METALLIZED SURFACE AND PROCESS FOR PRODUCING THE SAME

[75] Inventors: Yukihiro Kimura; Shunkichi Nozaki, both of Aichi, Japan

[73] Assignee: NGK Spark Plug Co., Ltd., Aichi, Japan

[21] Appl. No.: 333,507

[22] Filed: Dec. 22, 1981

[30] Foreign Application Priority Data

Dec. 24, 1980 [JP] Japan .................. 55-184793

[51] Int. Cl.$^3$ .................. B22F 3/10; B22F 7/00
[52] U.S. Cl. .................. 419/9; 419/5; 419/14; 419/17; 428/548
[58] Field of Search .................. 75/208 R; 428/548; 419/5, 8, 9, 14, 17

[56] References Cited

U.S. PATENT DOCUMENTS 4,040,823 8/1977 Yamaguchi .................. 75/203
4,214,906 7/1980 Langer .................. 75/208 R Primary Examiner—Deborah L. Kyle
Assistant Examiner—Anne Brookes
Attorney, Agent, or Firm—Sughrue, Mion, Zinn, Macpeak & Seas

[57] ABSTRACT

Sintered silicon carbide materials are described, which have a metallized surface consisting essentially of a composition comprising 10 to 90% by weight of Si, balance a mixture of at least two components selected from Fe, Ni and Co.

A process for producing the silicon carbide sintered materials having the metallized surface is also described.

2 Claims, No Drawings

SINTERED SILICON CARBIDE MATERIALS HAVING METALLIZED SURFACE AND PROCESS FOR PRODUCING THE SAME

FIELD OF THE INVENTION

The present invention relates to metallizing a surface of a sintered silicon carbide material.

BACKGROUND OF THE INVENTION

In recent years, sintered silicon carbide materials, as well as sintered silicon nitride materials, have been used as high temperature, high strength materials, e.g., for gas turbines, high temperature furnaces or rocket nozzles. Further, utilizing their low friction characteristics, they have been used as a low friction members such as sealing rings, etc. Furthermore, utilizing their electric characteristics, they have been used as heat elements such as an ignitor which is represented by, for example, a glow type electric ignitor or a glow plug.

A glow type electric ignitor is a device which in response to an electric input generates a thermal output within a temperature range suitable, for example, for the ignition of a fuel, such as natural or artificial gas or the like. Such ignitor has utility in ranges, ovens, dryers, furnaces and similar appliances and devices.

However, in order to effectively utilize such ceramics which are brittle materials in such uses, it is necessary to bond them with metals or with another ceramic parts.

The processes for forming metallized surfaces used hitherto for alumina ceramics does not provide satisfactory results in bonding strength, air tightness at sealing areas and electric conduction when it is applied to sintered silicon carbide materials.

In light of the above described circumstances, the present invention provides a metallized surface composition for metallizing the surface of a sintered silicon carbide material and a process for producing the same.

Sintered silicon carbide materials have good wetting ability for silicon, as can be understood from the fact that reaction sintered silicon carbide materials are produced by impregnating the same with silicon between silicon carbide particles and carbon particles. However, sintered silicon carbide materials have a simple silicon surface can not be used, because simple silicon surface has so poor adhesive strength to silicon carbide that the resulting simple silicon layer peels off with impact, even if it wets silicon carbide, and it also has no adhesive strength to Ni plating or soldering materials.

SUMMARY OF THE INVENTION

The present invention was reached to overcome the above described problems. Namely, the present invention provides sintered silicon carbide materials having a metallized surface consisting essentially of a composition comprising 10 to 90% by weight Si, balance a mixture of at least two components selected from Fe, Ni and Co, and a process for producing a sintered silicon carbide material which comprises applying a powder comprising 10 to 90% by weight of Si, balance of the mixture being at least two components selected from Fe, Ni and Co or a powder prepared by alloying them at a temperature of 1100° to 1800° C. in a non-oxidative atmosphere for 10 to 60 minutes and powdering the same to a sintered silicon carbide material and sintering the resulting composite at a temperature of 1100° to 1800° C. for 10 to 60 minutes in a non-oxidative atmosphere.

DETAILED DESCRIPTION OF THE INVENTION

Processes for producing the sintered silicon carbide materials useful for the present invention are described, for example, in U.S. Pat. Nos. 4,004,934, 4,080,415, 4,081,284, and 4,124,666, and Japanese Patent Application (OPI) Nos. 167177/80 (the term "OPI" as used herein refers to "published unexamined Japanese Patent Application) and 120573/81.

The reason why the amount of Si is limited to 10 to 90% by weight ("by weight" is omitted, hereinafter) is as follows: If the amount is less than 10%, the wetting ability of the sintered silicon carbide materials tc the mixture of at least two components selected from Fe, Ni and Co is not effectively improved. If it is more than 90%, adhesive strength is inferior because of the reduced amount of the Fe, Ni and Co components.

The reason why two or more of Fe, Ni and Co are used is as follows: It is impossible, using only one of them, to form an alloy having a low coefficient of expansion, such as 4–2 alloy (composed of Fe 58% and Ni 42%) or Kovar (composed of Fe 54%, Ni 29% and Co 17%). The metallized surface consisting essentially of composition comprising Si, balance only one of Fe, Ni and Co cause separation from the sintered silicon carbide material because the coefficient of expansion thereof is high and does not agree with that of the sintered silicon carbide material. The coefficient of expansion of the metallized surface consisting essentially of a composition comprising Si, balance a mixture of at least two component selected from Fe, N and Co is preferably less than $9 \times 10^{-6}$ at each temperature from a room temperature to 1200° C.

If the sintering temperature is less than 1100° C., adhesion becomes inferior while if it is higher than 1800° C. Si evaporates to also cause inferior adhesion.

It is possible to form a metallized surface having good adhesive property and good wetting property to Ni plating or soldering materials by a process which comprises applying a pasty mixture prepared by mixing Si powder having a particle diameter of less than 44 μm, a metal powder having a particle diameter of less than 74 μm comprising at least two components selected from Fe, Ni and Co, a resin (e.g., polyvinyl butyral or ethyl cellulose) as binder and an organic solvent (e.g., butyl carbitol) as diluent to a surface of the sintered silicon carbide material and sintering the composite at a temperature of 1100° to 1800° C. and preferably 1200° to 1500° C., in a non-oxidative atmosphere.

A preferred example of a process for preparing pasty mixture comprises mixing 100 parts of powder comprising Si powder having a particle diameter of less than 44 μm and a metal powder comprising at least two components selected from Fe, Ni, and Co having a particle diameter of less than 74 μm, 5 to 20 parts of PVB (polyvinyl butyral) as binder, 5 to 10 parts of DBP (dibutyl phthalate) as plasticizer and 20 to 100 parts of butyl carbitol and adjusting the viscosity thereof to more than 100 poise.

When a pasty mixture of two or more of the Fe, Ni and Co powder was applied to a surface of the sintered silicon carbide material and heated to 1500° C. in vacuum, wetting was not observed. When a pasty mixture which was prepared by previously mixing at least two components selected from Fe, Ni, an Co each having a particle diameter of less than 74 μm with Si powder having a particle diameter of less than 44 μm, the purity of which powder was more than 95%, for 30 minutes using stainless pot and WC—Co ball, drying the same, alloying the same at 1500° C. in vacuum ($10^{-3}$ torr) for 30 minutes in the carbon crucible, cooling the product, and then powdering the product using pestle and mortar made of steel to obtain a powder having a particle diameter of less than 74 μm and the resulting powdered product was applied to a surface of a sintered silicon carbide material and the same heated to 1500° C. in vacuum, good results were obtained with respect to wetting property.

In order to demonstrate the adhesive strength of simple silicon surface to silicon carbide, an experiment was conducted as follows. A pair of test pieces (8 mm×4 mm×25 mm) of normal pressure sintered silicon carbide material were arranged lengthwise and adhered via 0.2 mm-thickness of simple silicon layer to obtain a sample, and then the adhesive strength of the sample was measured by a conventional three-point bending method (span: 20 mm). The test was repeated ten times in the same manner as described above. The thus obtained adhesive strengths were averaged to obtain the average strength of 1.2 Kg/mm². In this experiment, it was obserbed that all samples broke at the adhesive portion. Furthermore, from the results of another experiment, it was found that the surface metallized by simple silicon had no adhesive strength to Ni plating or soldering materials.

The sintering conditions by which sintered silicon carbide materials are prepared generally include an extremely high temperature as high as 1900° to 2200° C. in a nitrogen or argon atmosphere. However, the conditions under which the metallizing of the surface are charried out include a temperature of 1100° to 1800° C., and preferably 1200° to 1500° C., in a non-oxidative atmosphere for 10 to 30 minutes. Therefore, the characteristics of the sintered silicon carbide material are not deteriorated due to the conditions under which the metallized surface is formed.

The preferred particle diameter of the SiC powder is preferably less than 149 μm and more preferably less than 44 μm. The preferred particle diameter of the components selected from Fe, Ni, and Co is less than 74 μm. The purity of each component is more than 95%.

The preferred individual amounts of Fe, Ni, or Co added are from 10 to 90% by weight based on the total weight of the added metallic powders.

The non-oxidative atmosphere used includes vacuum conditions (less than $10^{-3}$ torr), atmospheric conditions (i.e., 1 atm) such as an inert gas (e.g., helium gas, argon gas, etc.), nitrogen gas, or a mixture of nitrogen gas and hydrogen gas.

The thickness of the metallized surface formed is preferably less than 100 μm.

In the following, the present invention is illustrated with reference to examples. However, the present invention is not limited to these examples. All parts are by weight unless otherwise indicated.

EXAMPLE 1

Si, Fe, Ni and Co powders were mixed so as to have ratios shown in Table 1. To 100 parts of the resultant mixed powder, 10 parts of PVB (polyvinyl butyral), 6 parts of DBP (dibutyl phthalate) and 60 parts of butyl carbitol were added and the system blended to form a pasty mixture. Using this pasty mixture, a surface of a test piece (8 mm×4 mm×25 mm) of normal pressure sintered silicon carbide material (specific resistance 0.05 Ωm) having a density of 92% of theoretical density was screen printed in a thickness of about 100 μm and the test piece sintered at 1500° C. in vacuum ($10^{-3}$ torr) for 10 minutes to form a metallized surface.

The sintered silicon carbide material described above was prepared according to the manner described in Japanese Patent Application (OPI) No. 120573/81 as follows. A commercially available β-SiC powder having an average particle diameter of 0.3 μm, and a boron carbide powder in the amount of 0.5% by weight, based on the weight of the SiC powder, were dispersed in a solution prepared by dissolving phenol resin in an amount of 6% based on the SiC powder in acetone. The mixture was blended by a wet mixing process, dried, screened, pressed and calcined at 800° C. in vacuum to prepare moldings. Moldings thus prepared were subjected to primary sintering by heating at a temperature from 1800° to 2050° C. in an Ar stream for 60 minutes to produce a primary sintered material. Then samples sintered at 1950° C. were subjected to the secondary sintering by heat treatment under a pressure of 80 atmospheres in $N_2$ to produce the desired secondary sintered material.

The metallized surface was then observed by the naked eye.

To calculate the contact resistance between the metalized surface and the sintered silicon carbide material, the resistances of the non-metallized test piece and the metallized test piece were measured as follows. That is, first, a metallized surface was formed on the upper side surface having an 8 mm-width and 25 mm-length of said silicon carbide test piece in a thickness of 10 μm, and an electrically conductive metal plate was electrically connected to the whole opposite surface thereof. Then a pair of needles were electrically connected, arranged in a direction perpendicular to the metallized surface so as to sandwich the test piece and the plate, and the leads from these needles were connected to a direct-current electric source with a predetermined electric current. Furthermore another pair of needles were arranged and electrically connected in the same manner as described above, separated from the first pair of needles at a certain distance in a direction paralell to the metallized surface and the electric potential established between these neadles were measured. From the relationship of the electric current and the electric potential, the resistance was calculated. This resistance is referred to as $R_M (\Omega)$. Next, the same test was applied to the non-metallized test piece, and a resistance was again calculated. This resistance is referred to as $R_S (\Omega)$. From those two resistances was calculated the contact resistance, referred to as $R_C (\Omega)$, according to the following equation, which makes the approximation that the resistance of the alloy forming the metallized surface can be disregarded.

$$R_C = R_M - R_2$$

Further, the separation strength was measured by separating the metal element from the adhesion surface according to the following method. First, a plurality of metallized surface areas having 2 mm-width and 2 mm-length were formed on the surface of said test piece, arranging them in a line along the one side line of the test piece at regular intervals. Next, a kovar metal element (1 mm×0.2 mm×12 mm) was prepared. The tips of a plurality of kovar metal elements were placed upon each metallized surface of the test piece by means of 0.1 mm of silver solder material (which is available as (trade mark) "BAg—8") in a width of 1 mm from the side lines of the test piece so that the contact area was 1 mm², and then was soldered at 800° C. in an atmosphere such as hydrogen gas or nitrogen gas for 10 minutes. The thus obtained sample from which the plurality of kovar metal elements extended in paralell with each other and in a direction perpendicular to the side line of the test piece were set on the holder, then the kovar metal elements were bent in an upward direction perpendicular to the adhesive surface, and separated from the adhesion surface in an upward direction perpendicular to the adhesion surface in a separation rate of 50 mm per minute.

TABLE 1

| No. | Si (%) | Fe (%) | Ni (%) | Co (%) | State of surface | Strength (Kg/mm) | Contact Resistance (Ω) |
|---|---|---|---|---|---|---|---|
| 1 | 100 | 0 | 0 | 0 | bad | — | — |
| 2 | 80 | 10 | 10 | 0 | good | 1.0 | <0.02 |
| 3 | 80 | 10 | 0 | 10 | good | 1.5 | " |
| 4 | 80 | 0 | 10 | 10 | good | 1.0 | " |
| 5 | 84 | 8 | 5 | 3 | good | 1.0 | " |
| 6 | 75 | 12.5 | 7.5 | 5 | best | 2.5 | " |
| 7 | 66 | 17 | 10 | 7 | best | 2.5 | " |
| 8 | 50 | 25 | 15 | 10 | best | 2.5 | " |
| 9 | 50 | 29 | 21 | 0 | good | 2.0 | " |
| 10 | 20 | 40 | 40 | 0 | good | 1.5 | " |
| 11 | 20 | 40 | 0 | 40 | good | 1.0 | " |
| 12 | 20 | 0 | 40 | 40 | good | 1.5 | " |
| 13 | 0 | 50 | 30 | 20 | bad | — | — |

TABLE 2

| No. | Si (%) | Fe (%) | Ni (%) | Co (%) | Atmosphere | Temperature | State of surface | Strength (Kg/mm) | Contact Resistance (Ω) |
|---|---|---|---|---|---|---|---|---|---|
| 6a | 75 | 12.5 | 7.5 | 5 | vacuum | 1000° C. | bad | — | — |
| 6b | " | " | " | " | " | 1500° C. | best | 2.5 | <0.02 |
| 6c | " | " | " | " | " | 1800° C. | good | 1.5 | " |
| 6d | " | " | " | " | Ar | 1500° C. | good | 1.0 | " |
| 6e | " | " | " | " | N₂ + H₂* | 1500° C. | good | 1.5 | " |
| 7a | 66 | 17 | 10 | 7 | vacuum | 1000° C. | bad | — | — |
| 7b | " | " | " | " | " | 1200° C. | best | 1.5 | <0.02 |
| 7c | " | " | " | " | " | 1350° C. | best | 2.5 | " |
| 7d | " | " | " | " | " | 1500° C. | best | 2.5 | " |
| 7e | " | " | " | " | " | 1800° C. | good | 1.0 | " |
| 7f | " | " | " | " | Ar | 1500° C. | good | 2.0 | " |
| 7g | " | " | " | " | " | 1800° C. | good | 1.0 | " |
| 7h | " | " | " | " | N₂ + N₂* | 1500° C. | good | 1.0 | " |
| 7i | " | " | " | " | " | 1800° C. | good | 1.0 | " |
| 8a | 50 | 25 | 15 | 10 | vacuum | 1000° C. | bad | — | — |
| 8b | " | " | " | " | " | 1500° C. | best | 2.5 | <0.02 |
| 8c | " | " | " | " | " | 1800° C. | good | 1.0 | " |
| 8d | " | " | " | " | Ar | 1500° C. | good | 1.0 | " |
| 8e | " | " | " | " | N₂ + H₂* | 1500° C. | good | 1.5 | " |

*The ratio of $N_2$ and $H_2$ was $N_2:H_2 = 1:3$, volume
The pressure of atmosphere was 1 atm.

As seen from Table 1, the most excellent metallized surface for the normal pressure sintered silicon carbide material was obtained in the case of testing a pasty mixture comprising 75 to 50% silicon, the balance kovar consisting of Fe, Ni and Co (Fe:Ni:Co=54:29:17). Though the reason therefor is not understood, this composition forms a metal having a low coefficient of expansion. The Fe:Ni=58:42 system yields the same result.

EXAMPLE 2

Using the two pasty mixtures which yielded the most excellent results as described above, the following experiment was carried out in order to examine the influence of sintering conditions on results. Sintering conditions and results are shown in Table 2.

As a result, it can be understood that materials which were subjected to metallizing at 1350° to 1500° C. under vacuum had the highest strength and showed very low contact resistance.

In these examples, metallizing on the surface of the normal pressure sintered silicon carbide material was described. However, the same properties as in Examples 1 and 2 were obtained in the case of application to the surface of reaction sintered silicon carbide, hot pressed silicon carbide or silicon carbide deposited by a chemical vaper deposition.

Since the metallized surface per the present invention has low contact resistance between it and the sintered silicon carbide material base, it is useful as a leading terminal in the case of utilizing the sintered silicon carbide material as a heat element. Thus, adhesion of a metal member and leading of the terminal can be carried out simultaneously to obtain high adhesive strength and, consequently, the sintered materials can used in glow plugs and ignitors, etc.

Of course, the present invention can be suitably utilized for bonding blades and a shaft or shaft portions themselves in a ceramic rotor for a gas turbine.

While the invention has been described in detail and with reference to specific embodiments thereof, it will be apparent to one skilled in the art that various changes and modifications can be made therein without departing from the spirit and scope thereof.

What is claimed is:

1. A process for producing silicon carbide sintered materials having a metallized surface which comprises applying a paste of a powder comprising 10 to 90% by weight of Si, balance a mixture of at least two components selected from Fe, Ni and Co to a sintered silicon carbide material and sintering at a temperature of 1100° to 1800° C. in a non-oxidative atmosphere.

2. The process for producing sintered silicon carbide materials having a metalized surface according to claim 1, wherein a powder obtained by alloying Si and a mixture of at least two components selected from Fe, Ni and Co at 1100° to 1800° C. in a non-oxidative atmosphere and powdering the same is used.

* * * * *